(12) United States Patent
Chaput et al.

(10) Patent No.: US 8,407,194 B1
(45) Date of Patent: Mar. 26, 2013

(54) DATA CLASSIFICATION AND PRIVACY REPOSITORY

(75) Inventors: Shawn R. Chaput, Vancouver (CA); Katarina Ringwood, Vancouver (CA)

(73) Assignee: Privity Systems Inc., Vancouver, BC (CA)

( * ) Notice: Subject to any disclaimer, the term of this patent is extended or adjusted under 35 U.S.C. 154(b) by 276 days.

(21) Appl. No.: 12/687,450

(22) Filed: Jan. 14, 2010

Related U.S. Application Data

(60) Provisional application No. 61/144,940, filed on Jan. 15, 2009.

(51) Int. Cl.
*G06F 17/30* (2006.01)
(52) U.S. Cl. ........................................ 707/694; 707/758
(58) Field of Classification Search .................. 707/694, 707/758
See application file for complete search history.

(56) References Cited

U.S. PATENT DOCUMENTS

| | | | |
|---|---|---|---|
| 2004/0236714 A1* | 11/2004 | Eisenberger et al. | 707/1 |
| 2004/0249497 A1* | 12/2004 | Saigh et al. | 700/216 |
| 2005/0187991 A1* | 8/2005 | Wilms et al. | 707/204 |
| 2006/0020814 A1* | 1/2006 | Lieblich et al. | 713/182 |
| 2007/0203874 A1* | 8/2007 | Cave et al. | 707/1 |
| 2008/0005184 A1* | 1/2008 | Myllyla et al. | 707/200 |
| 2008/0222201 A1* | 9/2008 | Chen et al. | 707/104.1 |
| 2009/0043786 A1* | 2/2009 | Schmidt et al. | 707/100 |
| 2009/0150425 A1* | 6/2009 | Bedingfield, Sr. | 707/102 |
| 2010/0161562 A1* | 6/2010 | Karajagi | 707/664 |

* cited by examiner

*Primary Examiner* — Son T Hoang
(74) *Attorney, Agent, or Firm* — Plumsea Law Group PLC

(57) ABSTRACT

A data classification and privacy repository for creating a secure and accurate database to inventory an organization's private or sensitive personally identifiable information includes at least one Meta Data Registry which links with an organization's enterprise database. The Meta Data Registry, scans, analyzes and classifies the files stored on an enterprise database and then hosts the metadata associated with those files in an indexable format. In one embodiment, the metadata is transported to a service provider/system administrator Aggregate Meta Data Repository where the metadata is validated, monitored, and assessed for risk. When a breach occurs, notifications to the appropriate individuals, companies, regulatory bodies and government agencies are automatically generated.

7 Claims, 8 Drawing Sheets

DATA CLASSIFICATION AND PRIVACY REPOSITORY

REFERENCE TO RELATED APPLICATIONS

This application claims the benefit of U.S. Provisional Patent Application No. 61/144,940 filed Jan. 15, 2009, priority from the filing date of which is claimed under 35 U.S.C. §119, and which is hereby fully incorporated by reference.

TECHNICAL FIELD

The subject matter described herein relates generally to the field of information security and privacy. More particularly the subject matter provides a system and method for classifying and handling sensitive data in business and government environments. In particular, the subject matter provides a data classification and privacy repository.

BACKGROUND

Driven by ensuing international legislation and regulations surrounding mandatory privacy breach notification, it has become imperative to understand an organization's privacy obligations with respect to the personally identifiable information that the organization holds. This is predicated on the maxim: "you can't manage what you can't measure". In other words, an organization must have a clear understanding of what types of data it is trying to manage, whether or not their data is subject to the new legislation, how the data gets affected and what type of risk value should be assigned to it, what steps should be taken if a loss was to occur, etc. none of which can happen without a comprehensive inventory of any given organization's data, regardless of its type and intended usage.

There is of yet unavailable a comprehensive system that fully meets all of the objectives of creating a secure and accurate database to inventory an organization's private or sensitive personally identifiable information ("PII"), automatically classify each piece of PII, monitor all accesses, edits, deletes and other modifications of PII, assess risk and generate alerts and notifications when a breach of any PII occurs, and generate summary reports.

SUMMARY

An objective of the presently described subject matter is to provide a data classification and repository system designed to maintain metadata about an organization's private or sensitive data and provide a mechanism for notification with respect to any breaches of that data.

In one aspect of the presently described subject matter, there is provided a data classification and privacy repository comprising:
  (a) at least one meta data registry, the at least one meta data registry comprising:
    i. a meta-data registry database designed and configured to host metadata in an indexable format;
    ii. a user programmable normalization & optimization engine linked to and in communication with the meta-data registry database, the normalization & optimization engine designed and configured to scan, normalize and optimize the metadata stored on the meta-data registry database;
    iii. a meta-data collector linked to the meta-data registry database, the meta-data collector designed and configured to link to an enterprise database and collect metadata therefrom and transport the collected metadata to the meta-data registry database;
    iv. an audit trails and access log collector linked to the meta-data registry database, the audit trails and access log collector designed and configured to link to the enterprise database, the audit trails and access log collector designed and configured to monitor and collect access logs and audit trails pertaining to data stored on the enterprise database, and, once collected, transport the access logs and audit trails to the meta-data registry database for storage therein;
    v. at least one sensor collector linked to the meta-data registry database, the at least one sensor collector designed and configured to collect data breach information from a security system and, once collected, transport the data breach information to the meta-data registry database for storage therein;
    vi. at least one media index interface linked to the meta-data registry database, the at least one media index interface designed and configured to link to and capture metadata from an external removable storage device, and, once captured, to transport that metadata to the meta-data registry database for storage therein;
    vii. a reporting engine linked to the meta-data registry database, the reporting engine designed and configured to query the metadata and information stored on the meta-data registry database and generate reports therefrom;
    viii. a batch and synchronization provider in communication with the meta-data registry database, the batch and synchronization provider designed and configured to monitor and capture any new metadata stored on the meta-data registry database and transport the new metadata to an external service provider through an external aggregate batch and synchronization provider;
  and,
  (b) an aggregate meta data registry, housing the aggregate batch and synchronization provider, the aggregate meta data registry in logical and operational communication with the at least one meta data registry by a coupling between the batch and synchronization provider and the aggregate batch and synchronization provider, the aggregate batch and synchronization provider designed and configured to accept and transport metadata transported from the batch and synchronization provider, the aggregate meta data registry further comprising:
    i. an aggregate meta data repository data base in communication with the aggregate batch and synchronization provider, the aggregate meta data repository data base designed and configured to accepted and store metadata transported from the batch and synchronization provider, the aggregate meta data repository data base designed and configured to host metadata in an indexable format;
    ii. a programmable aggregate normalization & optimization engine linked to and in communication with the aggregate meta data repository database, the aggregate normalization & optimization engine designed and configured to scan, normalize and optimize the metadata stored on the aggregate meta data repository database;
    iii. a data validation interface in communication with the aggregate meta data repository database, the data validation interface provided with links to verification sites, the data validation interface designed and configured to periodically probe the metadata stored on the aggregate meta data repository database and, when necessary, query the verification sites to verify the data stored on the aggregate meta data repository data base;

iv. a risk assessment engine in communication with the aggregate meta data repository database, the risk assessment engine designed and configured to scan the metadata stored on the aggregate meta data repository database and provide a quantitative risk value for the records at risk after a breach or data loss has occurred, the risk assessment engine designed to write the risk value to the metadata stored on the aggregate meta data repository database;

v. a notification engine in communication with the aggregate meta data repository database, the notification engine configured to query the metadata stored on the aggregate meta data repository database and extract the risk value stored therein, the notification engine designed and configured to automate the notification of a breach to appropriate individuals, companies, regulatory bodies and government agencies by generating mass mailing communications, e-mailing communications, and telephone lists depending on the risk value assigned by the risk assessment engine;

vi. a reporting and metrics engine linked to the aggregate meta data repository data base, the reporting and metrics engine designed and configured to monitor the metadata stored on the aggregate meta data repository data base and generate reports thereon.

In another aspect of the presently described subject matter there is provided a method of monitoring any privacy breach of an organization's stored personally identifiable information comprising the steps of: a) collecting, categorizing and storing metadata indexing personally identifiable information associated with each document stored on the organization's database; b) monitoring all accesses, edits, deletions and modifications of the stored metadata; c) periodically probing and verifying the stored metadata; d) assigning a risk value to each item of stored metadata; e) automatically generating notifications based on the assigned risk value and the monitored accesses, edits, deletions and modifications of the stored metadata.

BRIEF DESCRIPTION OF THE DRAWINGS

The presently described subject matter will be further understood from the following description with reference to the accompanying drawings of a representative Data Classification and Privacy Repository ("Data CPR") according to the described subject matter, in which all views are schematic and may not be to scale.

Figure 1:
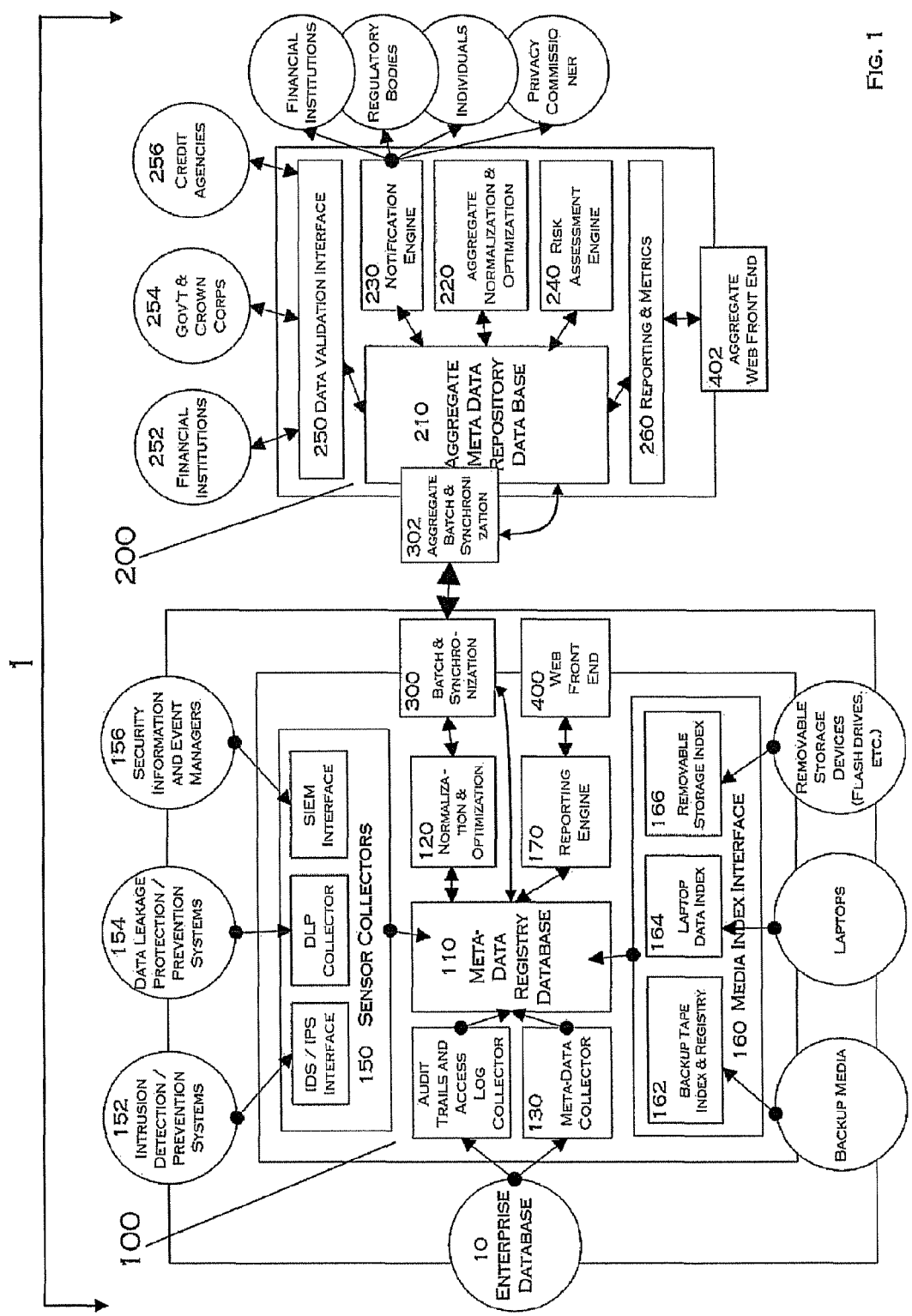
FIG. 1, in plan view, illustrates an embodiment of a Data CPR.

In the drawings, preferred embodiments of the Data CPR according to the presently described subject matter are illustrated by way of example. It is to be understood that the description and drawings are only for the purpose of illustration and as an aid to understanding, and are not intended to be a constraint on the limits of the invention made.

DETAILED DESCRIPTION

Referring to FIG. 1, there is illustrated a Data Classification and Privacy Repository ("Data CPR"), generally indicated as 1, in accordance with an embodiment of the presently described subject matter. The Data CPR 1 comprises a Meta Data Registry 100 and an Aggregate Meta Data Registry 200.

The Meta Data Registry 100 has a Meta-Data Registry Database 110 and the Aggregate Meta Data Registry has an Aggregate Meta Data Repository Data Base 210. The Meta-Data Registry Database 110 is linked to a Batch and Synchronization Provider 300 located in the Meta Data Registry 100 and the Aggregate Meta Data Repository Data Base 210 is linked to an Aggregate Batch and Synchronization Provider 302 located in the Aggregate Meta Data Registry 200. The Batch and Synchronization Provider 300 is linked to and in communication with the Aggregate Batch and Synchronization Provider 302 thereby logically and operationally coupling the Meta-Data Database 110 to the Aggregate Meta Data Repository Data Base 210.

Preferably, the Meta Data Registry 100 is located at a client site whereas the Aggregate Meta Data Registry 200 is located at a service provider/system administrator site.

The Meta-Data Registry Database 110 is designed and configured to host metadata in an indexable format. The Meta-Data Registry Database 110 assigns a hashed unique identifier ("UI1") to each physical piece of data inventoried and a second specific hashed unique identifier ("UI2") for each record inventoried. For example, in the case where the Meta-Data Registry Database 110 hosts 100 records of PII, such as a group of 100 medical patients, the database for the group of 100 medical patients would be assigned a UI1 and each individual within that group of medical patients would be assigned a UI2. Further, the record of each individual within the group of medical patients comprises a further database of a collection of PII, such as the patient's name, date of birth, social insurance number, etc. Accordingly, each individual would be assigned a unique UI1 to indicate a secondary database.

A user programmable Normalization & Optimization Engine 120 is coupled to the Meta-Data Registry Database 110. The Normalization & Optimization Engine 120 allows for efficient data storage and effective reading and writing of the data by allowing the client (user) to select the types of PII of interest to the client (user) and that are stored in the Meta-Data Registry Database 110.

All metadata associated with all classified data stored by a client organization on an Enterprise Database 10 is collected by a Meta-Data Collector 130 (located in the Meta Data Registry 100 and coupled to and in communication with the Meta-Data Registry Database 110) for transport to and storage on the Meta-Data Registry Database 110. Further, all access logs and audit trails pertaining to all classified data held by an organization in the Enterprise Database 10 is collected by an Audit Trails and Access Log Collector 140 (located in the Meta Data Registry 100 and coupled to and in communication with the Meta-Data Registry Database 110) for transport to and storage on the Meta-Data Registry Database 110. Each item of metadata stored on the Meta-Data Registry Database 110 is indexed to the appropriate unique identifier (UI1, UI2) to keep track of all accesses, modifications, and deletes to the classified data. In such a way, it is possible to monitor when an individual has added, viewed or modified classified data from the Enterprise Database 10. Information stored by the Meta-Data Registry Database 110 may include the UI1 and UI2 identifiers assigned to the data, the type of access or modification (for example, read, edit, new, delete, move), the time and date of access, the identity of the user who accessed the data, the IP address or the DNS name of the system that was used for access. The Enterprise Database 10 may be based on any commercial system such as MS-SQL™, MySQL™, DB2™, Oracle™, Sybase™, etc.

Other Sensor Collectors 150, located in the Meta Data Registry 100, and which are coupled to the Meta-Data Registry Database 110, are used to collect specific data breach related information from systems such as Intrusion Detection and Prevention Systems 152, Data Leakage Protection Systems 154, Security Information and Event Management Systems 156 and, once collected, the information is transported to and stored on the Meta-Data Registry Database 110.

The Meta Data Registry 100 is provided with a Media Index Interface 160 which is coupled to the Meta-Data Registry Database 110. The components of the Media Index Interface 160 may include, for example, a Backup Tape Index & Registry 162, a Laptop Data Index 164, and a Removable Storage Index 166. The components of the Media Index Interface 160 are designed to capture metadata about classified data on external removable storage devices such as back-up media, laptop computers, other portable computing devices such as smart phones, blackberries, etc. and removable storage devices such as USB drives or flash memory. Each device coupled to the Meta Data Registry 100 is assigned a unique device identification number and all the metadata associated with all classified data stored on that device is assigned to a database in the Meta-Data Registry Database 110. In the event that the external removable storage device is lost or stolen, the client organization will have a complete record of any data that may be compromised. The Media Index Interface 160 is configured such that when an external media is coupled to the Data CPR 1 the metadata associated with the files stored on that external media are replicated in the Meta Data Registry Database 110 such that any changes in the stored metadata may be monitored.

The Meta Data Registry 100 is provided with a Reporting Engine 170 which is coupled to the Meta-Data Registry Database 110. The Reporting Engine 170 provides the user with the ability to run reports in response to access-to-information requests or other regulatory or legislative requests about which classified data is being kept and how the classified data is being used (how often, in what manner, for what purpose, by whom, etc.). The Reporting Engine 170 queries the information stored in the Meta-Data Registry Database 110 to obtain the necessary information.

The Reporting Engine 170 also provides the client user with the ability to demonstrate or track compliance with regulations and legislations by showing an inventory of data and the related controls surrounding that data and providing status reports. The Reporting Engine 170 also provides general metrics and usage reporting. A Web Front-End 400 linked to the Reporting Engine 170 is used as the primary interface between the client user and the Reporting Engine 170.

The Reporting Engine 170 does not capture information, but rather queries the information captured by other interfaces in the Meta Data Registry 100 and stored on the Meta-data Registry Database 110 to provide useable data for demonstration of compliance, investigation of issues, or to respond accurately to Freedom of Information requests.

The Batch and Synchronization Provider 300 coupled with the Aggregate Batch and Synchronization Provider 302 accesses, reads and transports metadata from the Meta-Data Registry Database 110 to the Aggregate Meta Data Repository Data Base 210 where the metadata can be handled and processed by a service provider. The Aggregate Meta Data Registry 200 provides the ability to replicate specified data across the centralized system using batch processes. Some types of data require constant real-time connectivity between the Meta Data Registry 100 and the Aggregate Meta Data Registry 200 in order to monitor the use thereof. Whereas other types of data are pulled from the Meta Data Registry 100 to the Aggregate Meta Data Registry 200 on a regularly scheduled batch process. All data at rest and in transit is encrypted.

Figure 2:
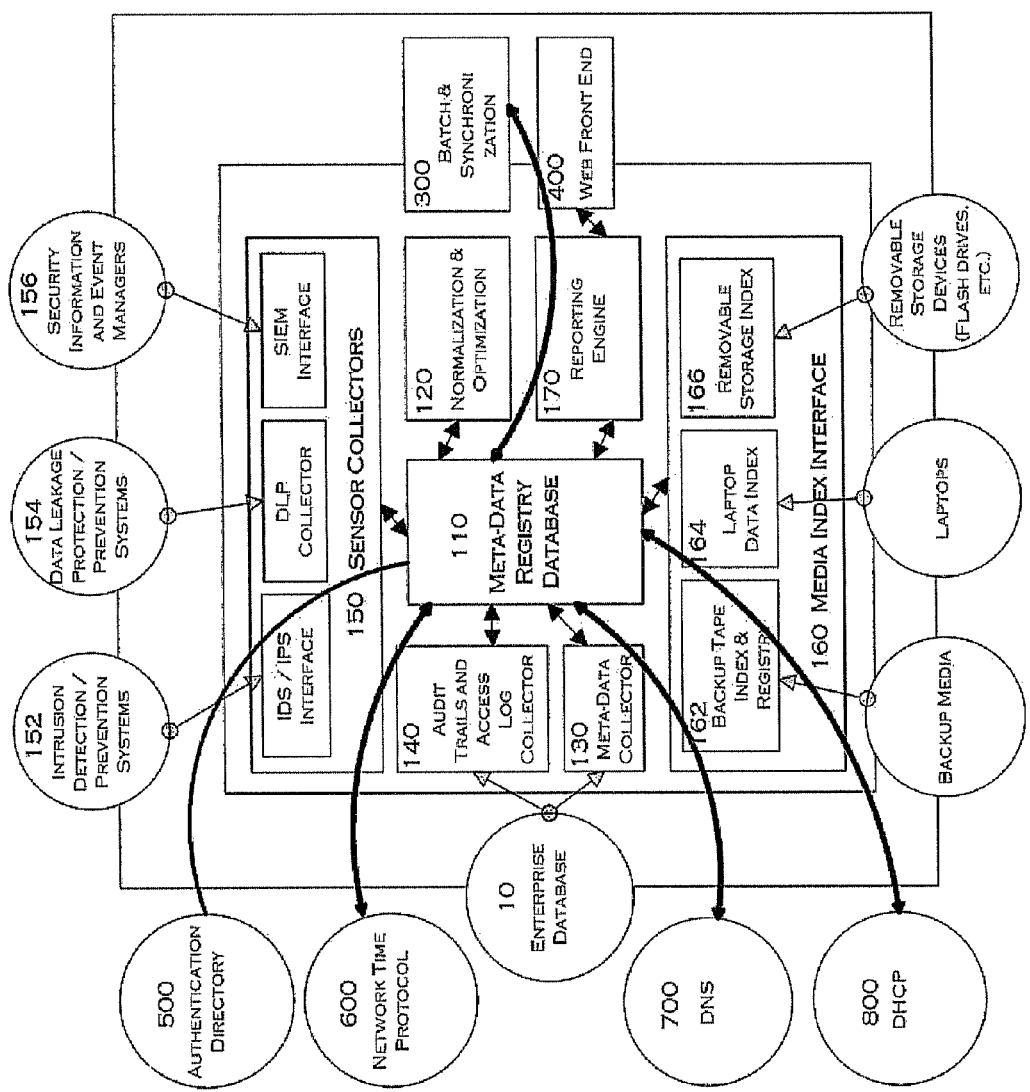
FIG. 2, in plan view, illustrates the components of the Meta-Data Registry Database of the Data CPR of FIG. 1.

Referring to FIG. 2, the Meta-Data Registry Database 110 is linked to an Authentication Directory 500, a Network Time Protocol 600, a Domain Name Systems ("DNS") Server 700, and a Dynamic Host Configuration Protocol ("DHCP") Server 800. All date and time information stored on the Meta-Registry Database 110 is obtained using the Network Time Protocol 600 from an enterprise time source which is Universal Coordinated Time ("UTC") compatible. All usernames are verified and cross-referenced to the Authentication Directory 500. The Authentication Directory 500 uses the Lightweight Directory Access Protocol ("LDAP"). Suitable systems for the Authentication Directory 500 include Microsoft™ Active Directory™, Sun One™ and Java™ System Directory Server. All IP addresses captured and stored on the Meta-Data Registry Database 110 are confirmed by the DNS Server 700 and the DHCP Server 800.

Figure 3:
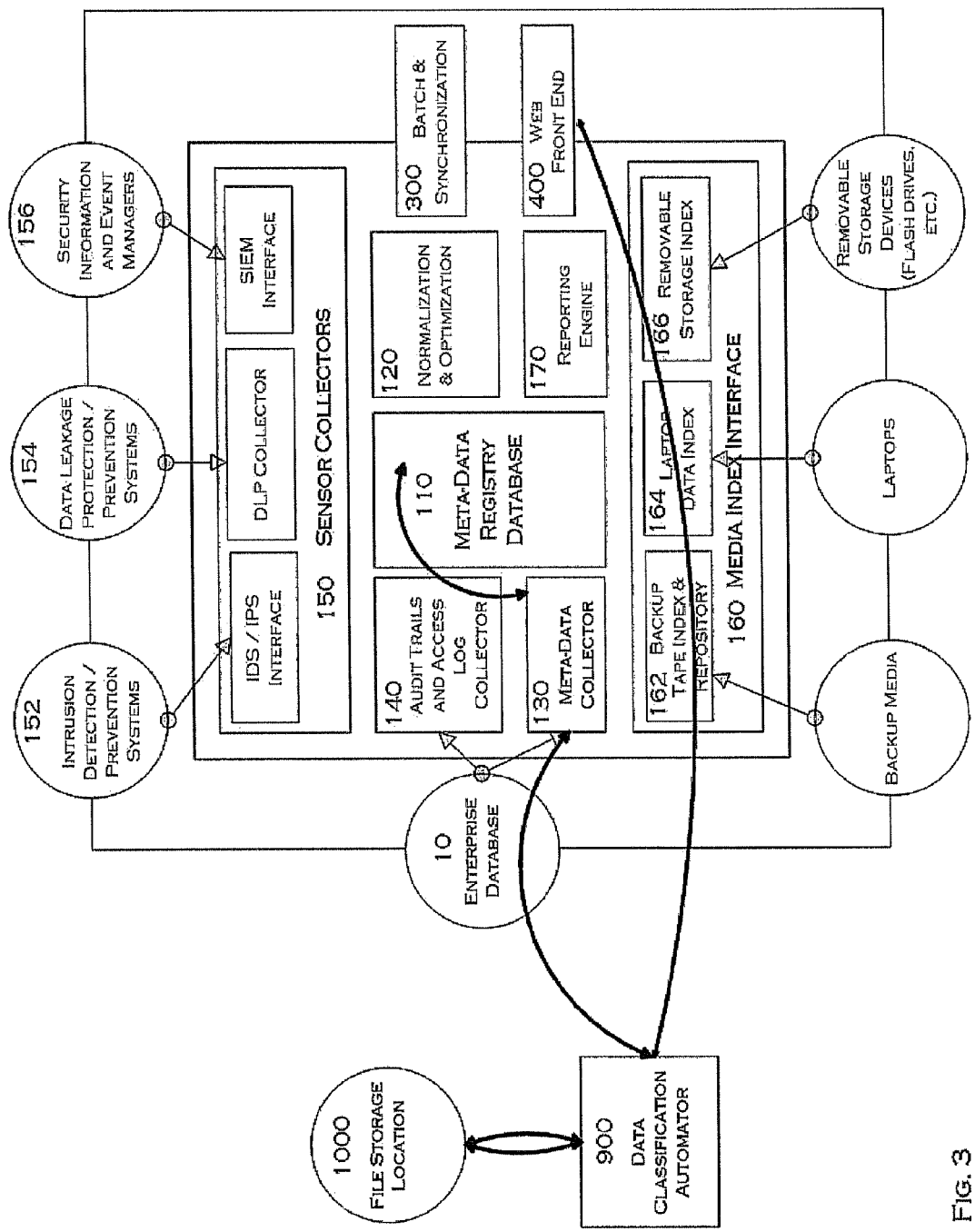
FIG. 3, in plan view, illustrates the linking of a Data Classification Automator to the Meta-Data Registry Database of the Data CPR of FIG. 1.

Referring to FIG. 3, in another embodiment of the presently described subject matter, the Data CPR 1 is provided with a Data Classification Automator 900 which is linked to the Enterprise Database 10. The Data Classification Automator 900 assists the client user of the Data CPR 1 by providing an automatic solution for classifying and labelling all data files in the Enterprise Database 10.

The Data Classification Automator 900 may be set by the client user to open all files of a certain specified type in a specified computer storage directory or folder and related subdirectories individually. The Data Classification Automator 900 can open and investigate documents such as Microsoft™ Word™ documents, text files, Word Perfect™ documents, Open Office™ documents, Lotus Notes™, etc.; Microsoft™ Excel™ documents, Lotus 1-2-3™, etc.; Adobe™ Acrobat™ PDF, etc.; Microsoft™ Access™ databases, etc.; and user defined documents. Once a document is opened by the Data Classification Automator 900, the Data Classification Automator 900 scans the document for key phrases and words that are indicative of typically sensitive information such as health numbers, social insurance numbers, social security numbers, credit card numbers, bank account numbers, "confidential", "secret", "top secret", "for your eyes only", "private, sensitive", home address, phone number, employee number, salary, etc. Other key phrases and words may be set by the user.

Once a document is scanned by the Data Classification Automator 900, the document is assigned a value based on a probability or a likelihood percentage of that document containing sensitive information and the type of information that the document contains. Classification and Labelling values can be set by the client user and may contain such labels as Public, Confidential, Secret, Top Secret, Private, PII, Financial, HR, Payment Card Industry, Trade Secret, etc.

An "owner" of each document scanned by the Data Classification Automator 900 is assigned based on the storage location of the document and its contents and an organizational chart which is loaded into the Data Classification Automator 900 by the client user through the Web Front End 400.

The client user may then review the list of identified documents and the recommended level of classification and owner information. The suggested classification and owner field of each document may be manually modified by the client user if desired.

Once the client user approves the classification of each document, the metadata of each document is published to the document itself (into the metadata or properties of that document stored on the Enterprise Database 10) and also to the Meta-Data Registry Database 110. The information published includes the file name, location, and classification.

The Data Classification Automator 900 may be linked to an external File Storage Location 1000 such as a Storage Area Network ("SAN") or Network Attached Storage ("NAS") so that all files stored on the File Storage Location 1000 may be scanned and classified before the associated metadata is collected by the Meta-Data Collector 130 and stored on the Meta-Data Registry Database 110.

Figure 4:
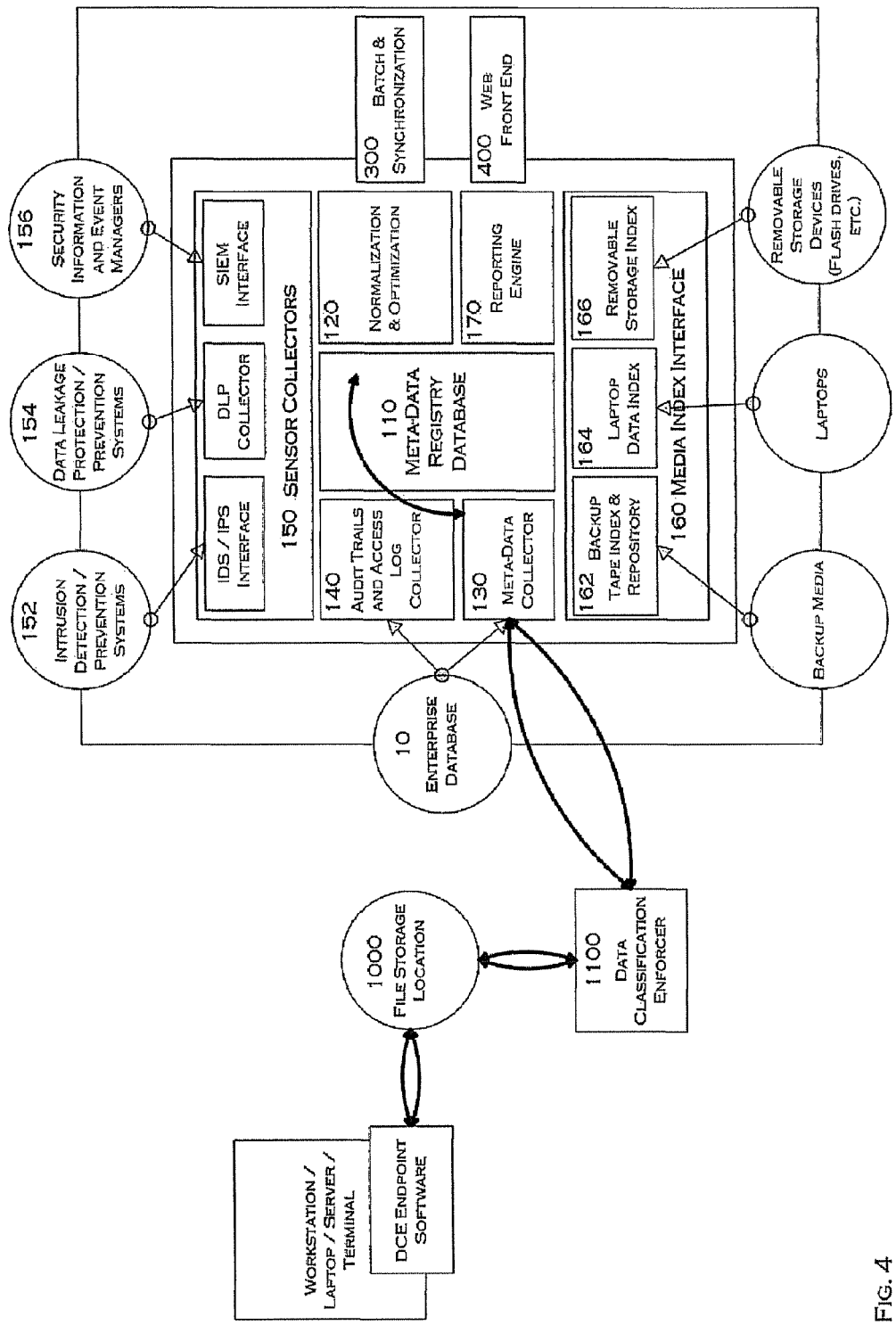
FIG. 4, in plan view, illustrates the linking of a Data Classification Enforcer to the Meta-Data Registry Database of the Data CPR of FIG. 1.

Referring to FIG. 4, in another embodiment of the presently described subject matter, the Data CPR 1 is provided with a Data Classification Enforcer 1100 which is linked to the Meta-Data Collector 130 and to the File Storage Location 1000. The Data Classification Enforcer 1100 can be configured to prohibit writing to a certain area within the File Storage Location 1000 unless the document is classified and labelled appropriately. When a client user creates a document and attempts to save the document to the File Storage Location 1000 which is linked to the Data Classification Enforcer 1100, the Data Classification Enforcer 1100 scans the document to verify whether the document has, at a minimum, a classification and an owner identified. If the information is missing, the Data Classification Enforcer 1100 prompts the client user to select the missing information from a drop-down menu listing all relevant options. The document in question is then labelled accordingly within its own metadata. The client user has the option of either cancelling or proceeding with the save command. If cancelled, no labelling or saving occurs, and accordingly, no metadata is created. If the client user elects to proceed, the information is written to the metadata of the document and then the Data Classification Enforcer 1100 links to the Meta-Data Collector 130 and transports the metadata information thereto.

Referring again to FIG. 1, the Aggregate Data Registry 200 is a database controlled by the service provider/system administrator consisting of the replicated data contained in the Meta Data Registry 100 of client organizations. Preferably, the Aggregate Data Registry 200 aggregates the information obtained from the metadata registries of multiple clients.

The Aggregate Meta-Data Repository Database 210 of the Aggregate Meta Data Registry 200, is linked and coupled to an Aggregate Normalization and Optimization Engine 220, a Notification Engine 230, a Risk Assessment Engine 240, a Data Validation Interface 250, and a Reporting and Metrics Engine 260.

The Aggregate Normalization & Optimization Engine 220 operates analogously to the Normalization & Optimization Engine 120 of the Meta Data Registry 100. The Aggregate Normalization & Optimization Engine 220 allows for efficient data storage and effective reading and writing of the data by allowing the service provider/system administrator to select the types of PII of interest to the various clients and that are stored in the Aggregate Meta-Data Repository Database 210.

The Data Validation Interface 250 is used to verify data stored in the Aggregate Meta Data Repository Data Base 210 and to assist in maintaining the value of that data over time. For example, the contact information for PII needs to be up-to-date and accurate in the event that an internal (client side) breach had occurred and the individuals whose records were compromised needed to be contacted (as required or directed by specific applicable laws or regulations). The Data Validation Interface 250 scans the data stored on the Aggregate Meta Data Repository Data Base 210 and queries the appropriate organization through links to, for example, Financial Institution Verification Links 252, Government & Crown Corporations Verification Links 254, and Credit Agencies Verification Links 256. Once validated by the appropriate agency, the Data Validation Interface 250 flags the related records in the Aggregate Meta Data Repository Data Base 210 as accurate for a certain period of time. When the time period expires the Data Validation Interface 250 re-activates the validation process.

The Risk Assessment Engine 240, which is coupled to the Aggregate Meta Data Repository Database 210, provides a quantitative Risk Value for the records at risk after a breach or data loss has occurred and provides the end-user with the ability to decide on which records to act. For example, if, say, tape #12423 was lost and that tape was known to have the records of 1000 people with a specific type of data, only those 1000 people would need to be notified. The Risk Assessment Engine 240 isolates the highest risk data and ranks the likelihood of that data being affected by the breach in question. The Risk Assessment Engine 240 queries the data within the Aggregate Meta-Data Repository Database 210 and calculates a Risk Value for each record stored therein and writes the calculated Risk Value into a field within the metadata of each record on the Aggregate Meta Data Repository Database 210.

The Notification Engine 230 queries the metadata stored in the Aggregate Meta-Data Repository Database 210. Based on the Risk Value that was assigned to each record in the Aggregate Meta-Data Repository Database 210 by the Risk Management Engine 240, the Notification Engine 230 will, if necessary, automate the mass mailing, e-mailing, phone calling, etc. to the appropriate individuals. For example, in the case of lost PII, the Notification Engine 220 will create personal mail to the affected individuals and prepare the mail for dispatch based on the provided contact information; compile a list of phone numbers of affected individuals; automate the delivery of a facsimile to affected individuals; send out e-mails to the affected individuals; or automate a combination of responses. Prior to dispatching any of the communications to the affected individuals, the Risk Management Engine 240 will wait for final approval from the service provider/system administrator. Note that, depending on the type of breach that has occurred, or in cases of certain types of data being lost (such as National Security Information loss, Credit card data breaches, etc.) notification may also be necessary for credit agencies, financial institutions, regulatory bodies, government agencies.

The Reporting & Metrics Engine 260 linked to and in communication with the Aggregate Web Front End 402 and which is accessible to the user through the Aggregate Web Front End 402 provides validation for billing and Service Level Agreements and Objectives based on the number of records, accesses, users, etc. The Reporting and Metrics Engine 260 also facilitates the mandatory "proof of notification", confirming that each individual or organization was contacted successfully (or unsuccessfully) and providing the date and time of the contact for audit purposes. The service provider/system administrator accesses the Reporting & Metrics Engine 260 through the Aggregate Web Front End 402. Based on the type of report requested by the service provider/system administrator, the Reporting & Metrics Engine 260 queries the metadata stored on the Aggregate Meta Data Repository Database 210 and generates the requested report for viewing by the service provider/system administrator on the Aggregate Web Front End 402. The service provider/system administrator has the option of responding to the generated report by causing the Reporting & Metrics Engine 260 to flag the metadata record stored on the Aggregate Meta Data Repository Database 210. Such a flag may be read, for example, by the Notification Engine 230 thereby enabling the Notification Engine 230 to finalize and dispatch communications to affected individuals.

Figure 5:
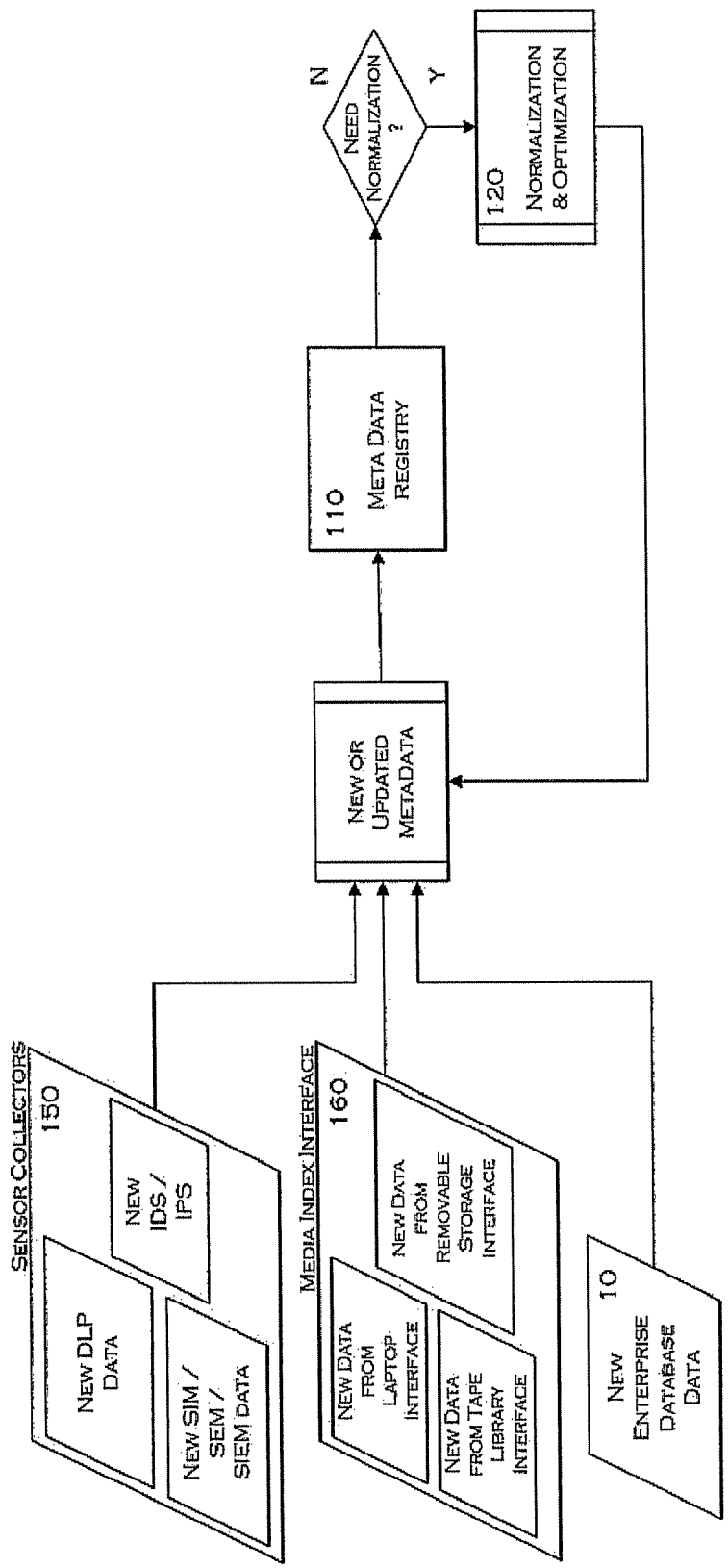
FIG. 5, in plan view, illustrates the data capture and normalization flow of the Data CPR of FIG. 1.

Referring to FIG. 5, there is illustrated the data capture and normalization flow diagram for the Data CPR 1 of FIG. 1. Metadata is captured from the various Sensor Collectors 150, the Media Index Interface 160 and the Enterprise Database 10. New or updated metadata is written to the Meta-Data Registry Database 110. The Normalization and Optimization Engine 120 queries the metadata stored on the Meta Data Registry Database 110 and, if necessary, normalizes and optimizes the metadata for storage on the Meta Data Registry Database 110.

Figure 6:
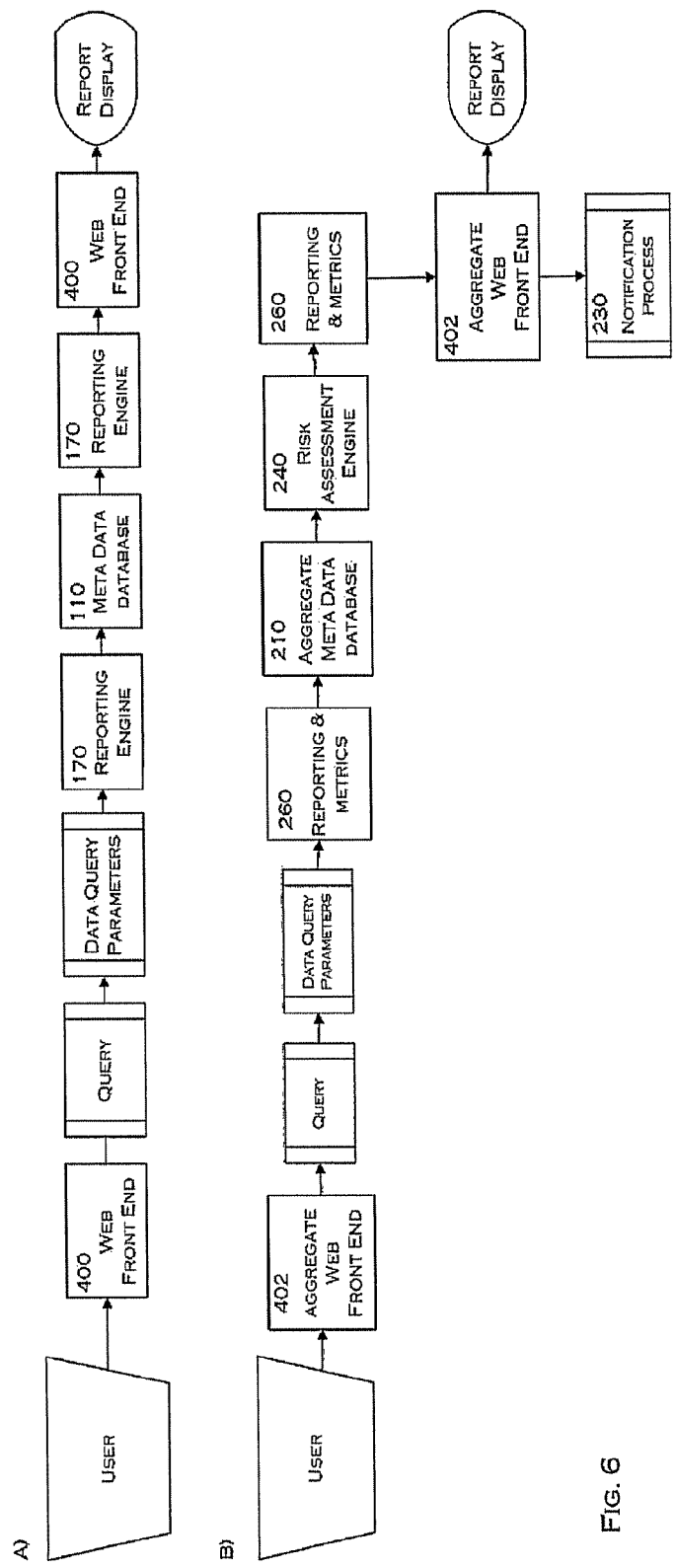
FIG. 6, in plan view, illustrates the logical flow diagram for displaying reports from the Data CPR of FIG. 1.

Referring to FIG. 6, there is illustrated a flow diagram for retrieving reports from (A) the Meta Data Registry Data Base 110 and (B) the Aggregate Meta Data Repository Data Base 210 of the Data CPR 1 of FIG. 1. Through the Web Front End 400, a user may query the Reporting Engine 170 to canvas the data stored in the Meta-Data Registry Database 110 and generate a report for display on the Web Front End 400. Alternatively, the service provider/system administrator, through the Aggregate Web Front End 402, may instruct the Reporting and Metrics Engine 260 to query the Aggregate Meta Data Repository Data Base 210 and, based on the Risk Value assigned to the meta-data, generate a report for output onto the Aggregate Web Front End 402. The service provider/system administrator, through the Aggregate Web Front End 402, then has the option of beginning or completing the notification process through use of the Notification Engine 230. If the service provider/system administrator determines that notification is required, the notification process can be invoked by the service provider/system administrator and then a report will be generated and displayed on the Aggregate Web Front End 402.

Figure 7:
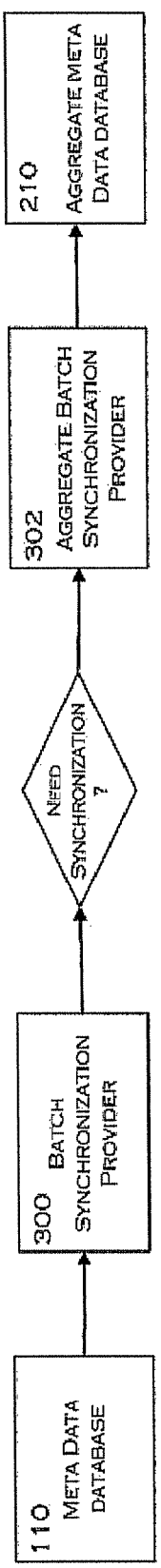
FIG. 7, in plan view, illustrates the logical flow for the Batch and Synchronization Provider of the Data CPR of FIG. 1.

Referring to FIG. 7, there is illustrated the logical flow for the Batch and Synchronization Provider of the Data CPR of FIG. 1. The Batch and Synchronization Provider 300 monitors the data stored on the Meta-Data Registry Database 110 and when the Batch and Synchronization Provider 300 detects that new or updated data has been written to the Meta-Data Registry Database 110, the Batch and Synchronization Provider 300 communicates with the Aggregate Batch and Synchronization Provider 302 and transports the updated metadata thereto. The Aggregate Batch and Synchronization Provider 302 then links to and updates the data stored on the Aggregate Meta Data Repository Data Base 210.

Figure 8:
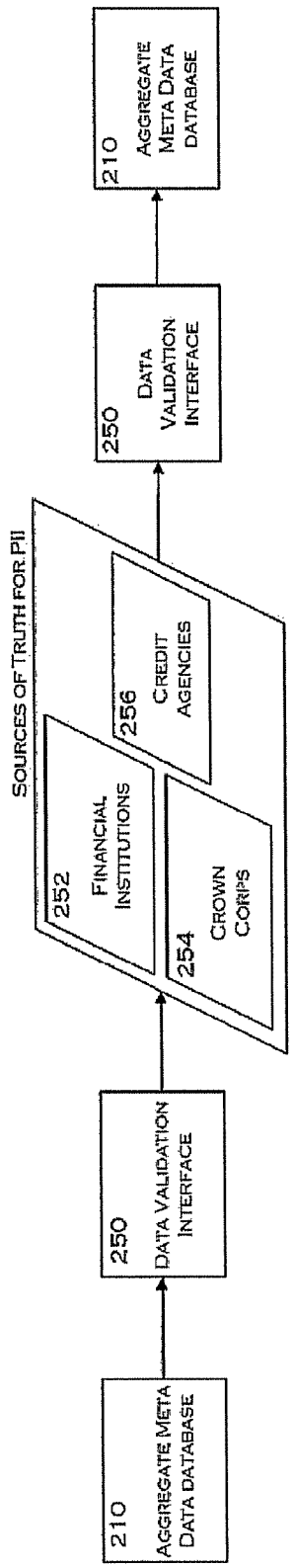
FIG. 8, in plan view, illustrates the logical flow for the validation of data stored in the Aggregate Meta Data Repository of the Data CPR of FIG. 1.

Referring to FIG. 8, there is illustrated the logical flow for the validation of data stored in the Aggregate Meta Data Repository Data Base 210 of the Data CPR 1 of FIG. 1. The Data Validation Interface 250 monitors and periodically verifies all new data stored on the Aggregate Meta Data Repository Data Base 210. The Data Validation Interface 250 is provided with links to various organizations (sources of truth for PII) such as Financial Institution Verification Links 252, Government & Crown Corporations Verification Links 254, and Credit Agencies Verification Links 256 over which verification of the stored metadata can be accomplished. The Data Validation Interface 250 compares the information stored on the Aggregate Meta Data Repository Data Base 210 with that obtained from the various sources of truth for PII and, if necessary, updates the metadata on the Aggregate Meta Data Repository Data Base 210 accordingly. Once validated by the appropriate agency, the Data Validation Interface 250 flags the related records in the Aggregate Meta Data Repository Data Base 210 as accurate for a certain period of time depending on the data type.

Other variations and modifications are possible. For example, all metadata could be normalized and optimized before writing the metadata to the Meta-Data Registry Database 110. The Meta Data Registry could be expanded to incorporate the Data Validation Interface, Risk Assessment Engine, Data Validation Interface, and Reporting and Metrics Engine without need for the Aggregate Meta Data Repository Data Base thus creating an integrated and self-contained Meta Data Registry and Aggregate Meta Data Registry. The Data Classification Automator 900 instead of being linked to either the Enterprise Database 10 or the external File Storage 1000 location may be linked directly to the Meta-Data Registry Database. All such modifications or variations and others that will occur to those skilled in the design of such systems are considered to be within the scope of the invention as defined by the claims appended hereto.

We claim:
1. A data classification and privacy repository comprising:
a first computer system;
a second computer system;
at least one metadata registry executing on the first computer system, the at least one metadata registry comprising:
  i) a metadata registry database designed and configured to host metadata in an indexable format;
  ii) a user programmable normalization and optimization engine linked to and in communication with the metadata registry database, the normalization and optimization engine designed and configured to scan, normalize and optimize the metadata stored on the metadata registry database;
  iii) a metadata collector linked to the metadata registry database, the metadata collector designed and configured to link to an enterprise database and collect metadata therefrom and transport the collected metadata to the metadata registry database;
  iv) an audit trails and access log collector linked to the metadata registry database, the audit trails and access log collector designed and configured to link to the enterprise database, the audit trails and access log collector designed and configured to monitor and collect access logs and audit trails pertaining to data stored on the enterprise database, and, once collected, transport the access logs and audit trails to the metadata registry database for storage therein;
  v) at least one sensor collector linked to the metadata registry database, the at least one sensor collector designed and configured to collect data breach information from a security system and, once collected, transport the data breach information to the metadata registry database for storage therein;

vi) at least one media index interface linked to the metadata registry database, the at least one media index interface designed and configured to link to and capture metadata from an external removable storage device, and, once captured, to transport the captured metadata to the metadata registry database for storage therein;

vii) a reporting engine linked to the metadata registry database, the reporting engine designed and configured to query the metadata and information stored on the metadata registry database and generate reports therefrom;

viii) a batch and synchronization provider in communication with the metadata registry database, the batch and synchronization provider designed and configured to monitor and capture any new metadata stored on the metadata registry database and transport the new metadata to an external service provider through an external aggregate batch and synchronization provider; and an aggregate metadata registry executing on the second computer system in communication with the first computer system, housing the aggregate batch and synchronization provider, the aggregate metadata registry in logical and operational communication with the at least one metadata registry by a coupling between the batch and synchronization provider and the aggregate batch and synchronization provider, the aggregate batch and synchronization provider designed and configured to accept and transport the metadata transported from the batch and synchronization provider, the aggregate metadata registry further comprising:

i) an aggregate metadata repository data base in communication with the aggregate batch and synchronization provider, the aggregate metadata repository data base designed and configured to accepted and store the metadata transported from the batch and synchronization provider, the aggregate metadata repository data base designed and configured to host the stored metadata in the indexable format;

ii) a programmable aggregate normalization and optimization engine linked to and in communication with the aggregate metadata repository database, the aggregate normalization wand optimization engine designed and configured to scan, normalize and optimize the metadata stored on the aggregate metadata repository database;

iii) a data validation interface in communication with the aggregate metadata repository database, the data validation interface provided with links to verification sites, the data validation interface designed and configured to periodically probe the metadata stored on the aggregate metadata repository database and, when necessary, query the verification sites to verify the metadata stored on the aggregate metadata repository data base;

iv) a risk assessment engine in communication with the aggregate metadata repository database, the risk assessment engine designed and configured to scan the metadata stored on the aggregate metadata repository database and provide a quantitative risk value for records at risk after a breach or data loss has occurred, the risk assessment engine designed to write the quantitative risk value to the metadata stored on the aggregate metadata repository database;

v) a notification engine in communication with the aggregate metadata repository database, the notification engine configured to query the metadata stored on the aggregate metadata repository database and extract the quantitative risk value stored therein, the notification engine designed and configured to automate notification of the breach to appropriate individuals, companies, regulatory bodies and government agencies by generating mass mailing communications, e-mailing communications, and telephone lists depending on the quantitative risk value assigned by the risk assessment engine; and vi) a reporting and metrics engine linked to the aggregate metadata repository data base, the reporting and metrics engine designed and configured to monitor the metadata stored on the aggregate metadata repository data base and generate reports thereon.

2. The data classification and privacy repository of claim 1, wherein the security system is selected from a group consisting of an intrusion detection and prevention system, a data leakage protection system, and a security information and event management system.

3. The data classification and privacy repository of claim 1, wherein the external removable storage device is selected from a group consisting of a back-up media, a laptop computer, a portable computing device, and a flash drive.

4. The data classification and privacy repository of claim 1, wherein the data verification sites are selected from a group consisting of financial institution database verification sites, government database verification sites, Crown corporation verification sites, and credit agency verification sites.

5. The data classification and privacy repository of claim 1, further comprising a data classification automator linked to the enterprise database, the data classification automator designed and configured to open, scan and classify all documents stored on the enterprise database and generate and publish corresponding metadata thereof for subsequent collection by the metadata collector.

6. The data classification and privacy repository of claim 1, further comprising an external data classification automator linked to the metadata collector, the external data classification automator designed and configured to link to an external file storage location, the external data classification automator designed and configured to open, scan and classify all documents stored on the external file storage location and generate and publish corresponding metadata thereof for subsequent collection by the metadata collector.

7. The data classification and privacy repository of claim 1, further comprising a data classification enforcer linked to the an external file storage location and to the metadata collector, the data classification enforcer designed and configured to restrict writing of data to the external file storage location unless appropriate minimal identification information is included.

* * * * *